(12) United States Patent
Carew et al.

(10) Patent No.: US 7,738,449 B2
(45) Date of Patent: *Jun. 15, 2010

(54) METHOD AND APPARATUS FOR PROVIDING VOICE SIGNALS TO AND FROM A TELECOMMUNICATIONS SWITCH

(75) Inventors: A. J. Paul Carew, Austin, TX (US); Ronald D. Lutz, Round Rock, TX (US); Brendon W. Mills, Austin, TX (US)

(73) Assignee: GENBAND Inc., Plano, TX (US)

( * ) Notice: Subject to any disclaimer, the term of this patent is extended or adjusted under 35 U.S.C. 154(b) by 224 days.

This patent is subject to a terminal disclaimer.

(21) Appl. No.: 11/467,357

(22) Filed: Aug. 25, 2006

(65) Prior Publication Data
US 2006/0285546 A1 Dec. 21, 2006

Related U.S. Application Data

(63) Continuation of application No. 09/491,299, filed on Jan. 25, 2000, now Pat. No. 7,099,310, which is a continuation of application No. 09/356,250, filed on Jul. 16, 1999, now Pat. No. 6,512,764.

(51) Int. Cl.
*H04L 12/66* (2006.01)
(52) U.S. Cl. ........................... 370/356; 370/401
(58) Field of Classification Search .................. None
See application file for complete search history.

(56) References Cited

U.S. PATENT DOCUMENTS 4,381,427 A  4/1983  Cheal et al. ............... 179/2 DP (Continued)

FOREIGN PATENT DOCUMENTS

EP  0 789 470 A2  8/1997

(Continued)

OTHER PUBLICATIONS

Gudapati, et al., "Local Telephone Service for Cable Subscribers Using Packet Switched Access," ISS. World Telecommunications Congress, pp. 325-329, Sep. 21, 1997.

(Continued)

*Primary Examiner*—Bob A Phunkulh
(74) *Attorney, Agent, or Firm*—Jenkins, Wilson, Taylor & Hunt, P.A.

(57) ABSTRACT

A voice gateway (64) includes an input port (70) that receives a voice signal from an unbundled analog line (62) coupled to a Class 5 switch (52). The voice signal is converted to a digital format by an analog-to-digital and digital-to-analog converting unit (76). The voice signal is placed into a compressed format by a compressing/de-compressing unit (80) using a selected one of a plurality of compression ratios. The voice signal is placed into a transport frame by a packetizing/de-packetizing unit (84) according to a selected packet format. The voice signal is multiplexed with other voice signals by an output port (88). The output port (88) places the voice signal onto a selected one of a plurality of output lines in order to transport the voice signal in its transport frame to one of an office customer premises (12) and a residence customer premises (14).

30 Claims, 2 Drawing Sheets

U.S. PATENT DOCUMENTS

| | | | |
|---|---|---|---|
| 4,493,092 A | 1/1985 | Adams | 375/36 |
| 4,504,942 A | 3/1985 | Aro et al. | 370/58 |
| 4,507,793 A | 3/1985 | Adams | 375/36 |
| 4,512,025 A | 4/1985 | Frankel et al. | 375/36 |
| 4,578,537 A | 3/1986 | Faggin et al. | 179/2 DP |
| 4,608,686 A | 8/1986 | Barsellotti | 370/69.1 |
| 4,627,046 A | 12/1986 | Bellamy | 370/58 |
| 4,740,963 A | 4/1988 | Eckley | 370/110.1 |
| 4,748,656 A | 5/1988 | Gibbs et al. | 379/93 |
| 4,757,497 A | 7/1988 | Beierle et al. | 370/89 |
| 4,843,606 A | 6/1989 | Bux et al. | 370/89 |
| 4,853,949 A | 8/1989 | Schorr et al. | 379/2 |
| 4,881,226 A | 11/1989 | Lechner et al. | 370/110.1 |
| 4,903,292 A | 2/1990 | Dillon | 379/93 |
| 5,033,062 A | 7/1991 | Morrow et al. | 375/7 |
| 5,034,948 A | 7/1991 | Mizutani et al. | 370/79 |
| 5,042,028 A | 8/1991 | Ogawa | 370/58.2 |
| 5,050,164 A | 9/1991 | Chao | |
| 5,127,003 A | 6/1992 | Doll, Jr. et al. | 370/110.1 |
| 5,134,611 A | 7/1992 | Steinka et al. | 370/79 |
| 5,142,568 A | 8/1992 | Ogata et al. | 379/100 |
| 5,142,571 A | 8/1992 | Suzuki et al. | 379/279 |
| 5,151,923 A | 9/1992 | Fujiwara | 375/5 |
| 5,216,704 A | 6/1993 | Williams et al. | 379/93 |
| 5,220,560 A | 6/1993 | Ogasawara | 370/79 |
| 5,247,347 A | 9/1993 | Litteral et al. | 358/85 |
| 5,267,300 A | 11/1993 | Kao et al. | 379/93 |
| 5,305,312 A | 4/1994 | Fornek et al. | 370/62 |
| 5,317,627 A | 5/1994 | Richardson, Jr. et al. | 379/88 |
| 5,341,374 A | 8/1994 | Lewen et al. | 370/85.4 |
| 5,349,640 A | 9/1994 | Dunn et al. | 379/387 |
| 5,367,522 A | 11/1994 | Otani | 370/84 |
| 5,396,494 A | 3/1995 | Roposh | |
| 5,410,343 A | 4/1995 | Coddington et al. | 348/7 |
| 5,426,692 A | 6/1995 | Fujise | 379/93 |
| 5,448,635 A | 9/1995 | Biehl et al. | 379/399 |
| 5,459,788 A | 10/1995 | Kim | 379/399 |
| 5,473,675 A | 12/1995 | Chapman et al. | 379/93 |
| 5,479,407 A | 12/1995 | Ko et al. | |
| 5,479,447 A | 12/1995 | Chow et al. | 375/260 |
| 5,493,609 A | 2/1996 | Winseck, Jr. et al. | 379/96 |
| 5,499,241 A | 3/1996 | Thompson et al. | 370/73 |
| 5,535,198 A | 7/1996 | Baker et al. | 370/60 |
| 5,604,737 A | 2/1997 | Iwami et al. | 370/352 |
| 5,606,553 A | 2/1997 | Christie et al. | 370/394 |
| 5,610,910 A | 3/1997 | Focsaneanu et al. | 370/351 |
| 5,610,922 A | 3/1997 | Balatoni | 370/468 |
| 5,613,069 A | 3/1997 | Walker | 395/200.15 |
| 5,617,423 A | 4/1997 | Li et al. | 370/426 |
| 5,625,404 A | 4/1997 | Grady et al. | 348/7 |
| 5,625,685 A | 4/1997 | Allegranza et al. | 379/399 |
| 5,638,363 A | 6/1997 | Gittins et al. | 370/358 |
| 5,661,785 A | 8/1997 | Carpenter et al. | 379/93.15 |
| 5,668,857 A | 9/1997 | McHale | 379/93.07 |
| 5,671,251 A | 9/1997 | Blackwell et al. | 375/222 |
| 5,673,290 A | 9/1997 | Cioffi | 375/260 |
| 5,675,575 A | 10/1997 | Wall, Jr. et al. | 370/326 |
| 5,692,035 A | 11/1997 | O'Mahony et al. | 379/93 |
| 5,719,870 A | 2/1998 | Baker et al. | 370/463 |
| 5,737,333 A | 4/1998 | Civanlar et al. | 370/352 |
| 5,771,236 A | 6/1998 | Sansom et al. | 370/458 |
| 5,781,547 A | 7/1998 | Wilson | 370/395 |
| 5,781,617 A | 7/1998 | McHale et al. | 379/93.14 |
| 5,787,088 A | 7/1998 | Dagdeviren et al. | 370/493 |
| 5,793,843 A | 8/1998 | Morris | 379/59 |
| 5,828,666 A | 10/1998 | Focsaneanu et al. | 370/389 |
| 5,838,682 A | 11/1998 | Dekelbaum et al. | 370/401 |
| 5,841,840 A | 11/1998 | Smith et al. | 379/93.01 |
| 5,848,150 A | 12/1998 | Bingel | 379/399 |
| 5,862,134 A | 1/1999 | Deng | 370/352 |
| 5,864,747 A | 1/1999 | Clark et al. | 455/3.2 |
| 5,878,120 A | 3/1999 | O'Mahony | 379/93.09 |
| 5,881,142 A | 3/1999 | Frankel et al. | 379/167 |
| 5,883,941 A | 3/1999 | Akers | 379/93.08 |
| 5,889,773 A | 3/1999 | Stevenson, III | 370/352 |
| 5,889,774 A | 3/1999 | Mirashrafi et al. | 370/352 |
| 5,889,856 A | 3/1999 | O'Toole et al. | 379/399 |
| 5,896,377 A | 4/1999 | Boot et al. | 370/352 |
| 5,898,761 A | 4/1999 | McHale et al. | 379/93.01 |
| 5,901,205 A | 5/1999 | Smith et al. | 379/93.01 |
| 5,905,781 A | 5/1999 | McHale et al. | 379/93.14 |
| 5,907,548 A | 5/1999 | Bernstein | 370/353 |
| 5,917,814 A | 6/1999 | Balatoni | 370/352 |
| 5,936,952 A | 8/1999 | Lecomte | 370/352 |
| 5,940,479 A | 8/1999 | Guy et al. | 379/93.01 |
| 5,943,404 A | 8/1999 | Sansom et al. | 379/93.06 |
| 5,949,763 A | 9/1999 | Lund | 370/261 |
| 5,974,043 A | 10/1999 | Solomon | 370/352 |
| 5,978,390 A | 11/1999 | Balatoni | 370/540 |
| 5,982,767 A | 11/1999 | McIntosh | 370/352 |
| 5,991,292 A | 11/1999 | Focsaneanu et al. | 370/352 |
| 5,999,565 A | 12/1999 | Locklear, Jr. et al. | 375/222 |
| 5,999,598 A | 12/1999 | Henrick et al. | 379/93.07 |
| 6,034,953 A | 3/2000 | Smith | |
| 6,075,784 A | 6/2000 | Frankel et al. | 370/356 |
| 6,075,796 A | 6/2000 | Katseff et al. | 370/466 |
| 6,078,580 A | 6/2000 | Mandalia et al. | 370/352 |
| 6,081,517 A | 6/2000 | Liu et al. | 370/352 |
| 6,101,182 A | 8/2000 | Sistanizadeh et al. | 370/352 |
| 6,104,711 A | 8/2000 | Voit | |
| 6,112,084 A | 8/2000 | Sicher et al. | 455/426 |
| 6,118,780 A | 9/2000 | Dunn et al. | 370/355 |
| 6,125,113 A | 9/2000 | Farris et al. | 370/389 |
| 6,125,127 A | 9/2000 | Smith | |
| 6,130,879 A | 10/2000 | Liu | 370/230 |
| 6,130,883 A | 10/2000 | Spear et al. | 370/328 |
| 6,134,235 A | 10/2000 | Goldman et al. | 370/352 |
| 6,141,339 A | 10/2000 | Kaplan et al. | 370/352 |
| 6,144,667 A | 11/2000 | Doshi et al. | 370/401 |
| 6,144,670 A | 11/2000 | Sponaugle et al. | 370/401 |
| 6,154,445 A | 11/2000 | Farris et al. | 370/237 |
| 6,157,637 A | 12/2000 | Galand et al. | 370/356 |
| 6,167,042 A | 12/2000 | Garland et al. | 370/354 |
| 6,175,562 B1 | 1/2001 | Cave | 370/352 |
| 6,175,854 B1 | 1/2001 | Bretscher | 709/201 |
| 6,181,694 B1 | 1/2001 | Pickett | 370/353 |
| 6,181,715 B1 | 1/2001 | Phillips et al. | 370/493 |
| 6,192,044 B1 * | 2/2001 | Mack | 370/352 |
| 6,195,423 B1 * | 2/2001 | Smock et al. | 379/156 |
| 6,201,806 B1 | 3/2001 | Moffett | 370/356 |
| 6,205,139 B1 | 3/2001 | Voit | |
| 6,208,639 B1 | 3/2001 | Murai | 370/356 |
| 6,215,790 B1 | 4/2001 | Voit et al. | |
| 6,215,796 B1 | 4/2001 | Smith | |
| 6,222,829 B1 | 4/2001 | Karlsson et al. | 370/329 |
| 6,229,810 B1 | 5/2001 | Gerszberg et al. | 370/401 |
| 6,236,653 B1 | 5/2001 | Dalton et al. | 370/352 |
| 6,240,084 B1 | 5/2001 | Oran et al. | 370/352 |
| 6,240,085 B1 | 5/2001 | Iwami et al. | 370/352 |
| 6,243,377 B1 | 6/2001 | Phillips et al. | 370/354 |
| 6,243,398 B1 | 6/2001 | Kahane et al. | 370/522 |
| 6,259,708 B1 | 7/2001 | Cheng et al. | 370/493 |
| 6,262,979 B1 | 7/2001 | Anderson et al. | 370/267 |
| 6,335,936 B1 | 1/2002 | Bossemeyer et al. | |
| 6,404,746 B1 | 6/2002 | Cave et al. | |
| 6,411,704 B1 | 6/2002 | Pelletier et al. | |
| 6,438,218 B1 | 8/2002 | Farris et al. | |
| 6,522,352 B1 | 2/2003 | Strandwitz et al. | |
| 6,526,046 B1 | 2/2003 | Carew | |
| 6,542,497 B1 | 4/2003 | Curry et al. | |
| 6,546,003 B1 | 4/2003 | Farris | |
| 6,546,016 B1 | 4/2003 | Gerszberg et al. | |
| 6,560,222 B1 | 5/2003 | Pounds et al. | |
| 6,563,829 B1 | 5/2003 | Lyles et al. | |

| | | | |
|---|---|---|---|
| 6,678,253 | B1 | 1/2004 | Heath, Jr. et al. |
| 6,819,664 | B1 | 11/2004 | Jeong |
| 6,839,342 | B1 | 1/2005 | Parham et al. |
| 7,184,427 | B1 | 2/2007 | Carew et al. |
| 7,385,963 | B1 | 6/2008 | Carew et al. |
| 2002/0057701 | A1 | 5/2002 | Mills |
| 2002/0064139 | A1 | 5/2002 | Bist et al. |

FOREIGN PATENT DOCUMENTS

| | | |
|---|---|---|
| EP | 0 841 831 A2 | 5/1998 |
| GB | 2313979 A | 12/1997 |
| WO | WO97/23078 | 6/1997 |
| WO | WO 97/37458 | 10/1997 |
| WO | WO 98/42104 | 9/1998 |
| WO | WO 99/49608 | 9/1999 |
| WO | WO 00/56050 | 9/2000 |
| WO | WO 00/69131 | 11/2000 |
| WO | WO 01/05130 A1 | 1/2001 |
| WO | WO 01/06720 | 1/2001 |
| WO | WO 01/13593 A1 | 2/2001 |
| WO | WO 01/13618 A1 | 2/2001 |

OTHER PUBLICATIONS

PCT International Search Report, 7 pages, Feb. 5, 2001.
L. Van Hauwermeiren, et al., "Offering Video Services over Twisted Pair Cables to the Residential Subscriber by means of an ATM based ADSL Transmission System," ISS Symposium, vol. 1, 5 pages, Apr. 1995.
T.C. Kwok, "Residential Broadband Architecture Over ADSL and G.Lite (G.992.2): PPP Over ATM," XP-000830885, IEEE Communication Magazine, 6 pages, May 1999.
Notification of Transmittal of the International Search Report or the Declaration, 7 pages, May 2, 2001.
Notification of Transmittal of the International Search Report or the Declaration, 7 pages, Jun. 29, 2001.
Unknown, "Gateway control protocol," ITU-T Telecommunication Standardization Sector of ITU, Series H: Audiovisual and Multimedia Systems, Infrastructure of audiovisual services—Communication procedures, ITU-T Recommendation H.248, 224 pages, Jun. 2000.
Unknown, "Packet-based multimedia communications systems," ITU-T Telecommunication Standardization Sector of ITU, Series H: Audiovisual and Multimedia Systems, Infrastructure of audiovisual services—Systems and terminal equipment for audiovisual services, ITU-T Recommendation H.323, 124 pages, Feb. 1998.
Unknown, "Voice and Telephony Over ATM—ATM Trunking using AAL 1 for Narrowband Services, Version 1.0," the Atm Forum Technical Committee, AF-VTOA-0089.000, 64 pages, Jul. 1997.
Unknown, "Voice and Telephony Over ATM to the Desktop Specification," the ATM Forum Technical Committee, af-vtoa-0083.000, 43 pages May 1997.
Unknown, "Call Signaling Protocols and Media Stream Packetization for Packet Based Multimedia Communications Systems," ITU-T Telecommunication Standardization Sector of ITU, Line Transmission of Non-Telephone Signals, ITU-T Recommendation H.225.0, Version 2, 141 pages, Mar. 25, 1997.
Unknown, "Visual telephone systems and equipment for local area networks which provide a non-guaranteed quality of service," ITU-T Telecommunication Standardization Sector of ITU, Series H: Audiovisual and Multimedia services—Systems and terminal equipment for audiovisual services, ITU-T Recommendation H.323, 79 pages Nov. 1996.
Unknown, "Adaptation of H.320 visual telephone terminals to B-ISDN environments," ITU-T Telecommunication Standardization Sector of ITU, Series H: Transmission of Non-Telephone Signals, Infrastructure of audiovisual services—Systems and terminal equipment for audiovisual services, ITU-T Recommendation H.321, 20 pages, Mar. 1996.
K. Gudapah & S.G. Bali, "Local Telephone Service for Cable Subscribers Using Packet Switched Access," XVI World Telecom Congress Proceedings, Presentation Session 8—Access Networks 1, 5 pages.

J.M. Fossaceca, J.D. Sandoz, and P. Winterbottom, "The PathStart™ Access Server: Facilitating Carrier-Scale Packet Telephony," Bell Labs Technical Journal, 17 pages, Oct.-Dec. 1998.
F. Dawson, Contributing Editor, "Packet-Based Voice, Video Becoming Real Market, New software, codecs make integration of voice over data networks more feasible and affordable," http://www.zdnet.com/intweek/print/970303/inwk0006.html, 6 pages, c 1997, Aug. 7, 2001.
Unknown, "Telogy Networks' Voice over Packet White Paper," http://www.telogy.com/our_products/golden_gateway/VOPwhite.html, 14 pages, Aug. 7, 2001.
Unknown Author, "The Role of Voice-Data Integration in Transforming your Business to e-business," IBM Networking White Papers: Voice-Data Integration in e-business, http://www.networking.ibm.com/voice/voice-data.html, 23 pages, Aug. 7, 2001.
Unknown Author, Press Release, "VOCALTEC expands telephony gateway product line with new eight-line solution for corporate intranets and internet service providers," VocalTec—The First and the Best, http://www.vocaltec.com/html/news1996/press_11_25.html, 5 pages, Aug. 8, 2001.
Unknown Author, Press Release, "VOCALTEC introduces the internet phone telephony gateway linking traditional and internet telephone networks," VocalTec—The First and the Best, http://www.vocaltec.com/html/news1996/press_03_08.html, 3 pages, Aug. 7, 2001.
Unknown Author, Press Release, "VOCALTEC's telephony gateway software captures 1996 product of the year honors from Computer Telephony magazine," VocalTec—The First and the Best, http://www.vocaltec.com/html/news1996/press_12_18.html, 3 pages, Aug. 7, 2001.
V.C. Majeti, "A Network Management Model for ADSL-based Broadband Systems," ADSL Forum Network Management Group, Brussels, Belgium, ADSL-Forum 97-112, 4 pages, Sep. 15, 1997.
V.C. Majeti, "Network Management System (NMS) Operations for ADSL-based Broadband Systems," ADSL Forum Network Management Group, Brussels, Belgium, ADSL Forum 97-113, 4 pages, Sep. 15, 1997.
Unknown Author, "Network Migration Working Text," ADSL Forum WT-013, ADSLForum WT013, Draft D, 60 pages, Jul. 8, 1997.
Unknown Author, "Network Migration Working Text," ADSL Forum WT-013, ADSLForum WT013, Draft C, 55 pages, Apr. 18, 1997.
Unknown Author, "Network Migration Working Text," ADSL Forum WT-013, ADSLForum WT013, Draft B, 53 pages, Jan. 12, 1997.
Unknown Author, "Network Migration Working Text," ADSL Forum WT-00x, ADSLForum 96-116, 32 pages, Dec. 10, 1996.
Unknown Author, "A Discussion of Voice over Frame Delay," Voice over FR, http://www.frforum.com/4000/4017052699.html, 10 pages, Aug. 7, 2001.
M. Coronaro, B. Rossi, "Integrated Office Communication System," Office Communication System, Electrical Communication—vol. 60, No. 1, 1986.
Clougherty et al., "The AnyMedia® Access System-Providing Solutions for Distribution and Network," XP-000851513, Bell Labs Technical Journal, Apr.-Jun. 1999, pp. 98-127.
PCT International Search Report in International Application No. PCT/US 01/44491, dated Jun. 3, 2002, 7 pages.
Notice of Allowance and Fee(s) Due for U.S. Appl. No. 09/724,714 (Feb. 8, 2008).
Official Action for U.S. Appl. No. 09/724,714 (Aug. 10, 2007).
Notice of Panel Decision From Pre-Appeal Brief Review for U.S. Appl. No. 09/724,714 (May 29, 2007).
Advisory Action for U.S. Appl. No. 09/724,714 (Jan. 31, 2007).
Final Official Action for U.S. Appl. No. 09/724,714 (Nov. 15, 2006).
Notice of Allowance and Fee(s) Due for U.S. Appl. No. 09/724,603 (Oct. 26, 2006).
Official Action for U.S. Appl. No. 09/724,714 (May 5, 2006).
Notice of Allowance and Fee(s) Due for U.S. Appl. No. 09/491,299 (Apr. 24, 2006).
Notice of Panel Decision From Pre-Appeal Brief Request for U.S. Appl. No. 09/724,603 (Mar. 15, 2006).
Advisory Action for U.S. Appl. No. 09/491,299 (Feb. 17, 2006).
Advisory Action for U.S. Appl. No. 09/724,603 (Jan. 5, 2006).
Advisory Action for U.S. Appl. No. 09/724,714 (Dec. 28, 2005).

Final Official Action for U.S. Appl. No. 09/491,299 (Dec. 2, 2005).
Final Official Action for U.S. Appl. No. 09/724,603 (Sep. 27, 2005).
Final Official Action for U.S. Appl. No. 09/724,714 (Sep. 7, 2005).
Official Action for U.S. Appl. No. 09/491,299 (May 19, 2005).
Official Action for U.S. Appl. No. 09/724,603 (Feb. 23, 2005).
Official Action for U.S. Appl. No. 09/724,714 (Feb. 8, 2005).
Advisory Action for U.S. Appl. No. 09/491,299 (Dec. 27, 2004).
Final Official Action for U.S. Appl. No. 09/724,714 (Sep. 20, 2004).
Final Official Action for U.S. Appl. No. 09/491,299 (Sep. 15, 2004).
Official Action for U.S. Appl. No. 09/724,603 (Jun. 24, 2004).
Advisory Action for U.S. Appl. No. 09/724,603 (Apr. 5, 2004).
Official Action for U.S. Appl. No. 09/724,714 (Apr. 2, 2004).
Final Official Action for U.S. Appl. No. 09/724,603 (Dec. 31, 2003).
Official Action for U.S. Appl. No. 09/491,299 (Dec. 18, 2003).
Official Action for U.S. Appl. No. 09/724,714 (Jul. 7, 2003).
Official Action for U.S. Appl. No. 09/724,603 (Jun. 20, 2003).
Notice of Allowability for U.S. Appl. No. 09/356,250 (Nov. 18, 2002).
Notice of Allowance and Fee(s) Due for U.S. Appl. No. 09/356,250 (Aug. 27, 2002).
Advisory Action for U.S. Appl. No. 09/356,250 (Mar. 19, 2002).
Final Official Action for U.S. Appl. No. 09/356,250 (Dec. 18, 2001).
Official Action for U.S. Appl. No. 09/356,250 (Jun. 22, 2001).
Notification of Transmittal of the International Search Report or the Declaration for International Application No. PCT/US00/19412 (Oct. 19, 2000).

* cited by examiner

METHOD AND APPARATUS FOR PROVIDING VOICE SIGNALS TO AND FROM A TELECOMMUNICATIONS SWITCH

CROSS REFERENCE TO RELATED APPLICATIONS

This application is a continuation of U.S. application Ser. No. 09/491,299 filed Jan. 25, 2000 and now U.S. Pat. No. 7,099,310, which is a continuation of U.S. application Ser. No. 09/356,250 filed Jul. 16, 1999 and now U.S. Pat. No. 6,512,764, each of which is hereby incorporated herein by reference.

TECHNICAL FIELD OF THE INVENTION

The present invention relates in general to telecommunications signal processing and more particularly to a method and apparatus for providing voice signals to and from a telecommunications switch.

BACKGROUND OF THE INVENTION

The traditional circuit switched telecommunications network has been implemented to dedicate one voice line to one loop or copper pair. This has worked well for over a hundred years but does not efficiently utilize the bandwidth of the copper pair. In addition, there has been a surge in demand for second, and even third, residential phone lines. This demand is exhausting the supply of available copper circuits. Business customers also have a high demand for phone lines. To meet this demand, Regional Bell Operating Companies, Independent Local Exchange Carriers, and Competitive Local Exchange Carriers would have to build additional copper or fiber infrastructure.

New technology, such as Digital Subscriber Line, voice-over-IP, and asynchronous transfer mode techniques have created an environment where the copper pair's available bandwidth can be more fully utilized to carry voice and data. However, traditional voice traffic is time division multiplexed, a transport architecture that segments the network bandwidth into fixed time sequenced channels. The smallest channel is equivalent to a voice line. Time division multiplexed networks work well for uncompressed analog voice but not for bursty data. If a data network needs more than 64 kilobits per second of bandwidth, the amount of one channel, two channels would be needed to carry 65 kilobits per second, resulting in bandwidth inefficiencies.

With the explosion of the Internet, worldwide deployment of Digital Subscriber Lines will rapidly accelerate over the next few years. Today, however, the penetration rate for voice over DSL is at zero percent. With the increase in their deployment, DSL is a prime candidate for implementing a multiple voice line capability for telecommunications customers. There have been recent efforts to provide voice over DSL. However, these efforts have required a GR-303 connection with a Class 5 switch for the gateway device. This GR-303 connection is available at the regional bell operating company or independent local exchange carrier level but competitive local exchange carriers would need to provide there own Class 5 switch or digital loop carrier functionality to interface with the GR-303 connection. In order to implement this functionality, competitive local exchange carriers would have to incur costly expense in providing this infrastructure. Therefore, it is desirable to migrate voice services into the data transport network in order to efficiently use the bandwidth of the copper pair and avoid expensive infrastructure changes in allowing a competitive local exchange carrier to implement an increased and efficient voice transport capability.

SUMMARY OF THE INVENTION

From the foregoing, it may be appreciated that a need has arisen to efficiently provide voice signal transport without bandwidth inefficiency. In accordance with the present invention, a method and apparatus for providing voice signals to and from a telecommunications switch are provided which substantially eliminate or reduce disadvantages and problems associated with conventional voice transport techniques.

According to an embodiment of the present invention, there is provided an apparatus for providing voice signals from a telecommunications switch that includes an input port operable to receive an unbundled analog line from the telecommunications switch, wherein a voice signal is carried over the analog line. An analog-to-digital converter unit converts the voice signal carried on the analog line into a digital format. A compressing unit places the voice signal into a compressed format. A packetizing unit places the voice signal into a packet format for transport over a data network.

The present invention provides various technical advantages over conventional voice transport techniques. For example, one technical advantage is to provide unbundled analog line ports to a competitive local exchange carrier without the need for an overlay Class 5 switch or digital loop carrier architecture. Another technical advantage is to mimic the dynamic allocation of timeslots of a standard GR-303 interface without utilizing that interface in order to provide an oversubscription capability. Yet another technical advantage is the ability to support a multitude of voice transport framing philosophies. Still another technical advantage is to provide selective compression and packetizing capabilities for versatile voice transport operation. Other technical advantages may be readily apparent to those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
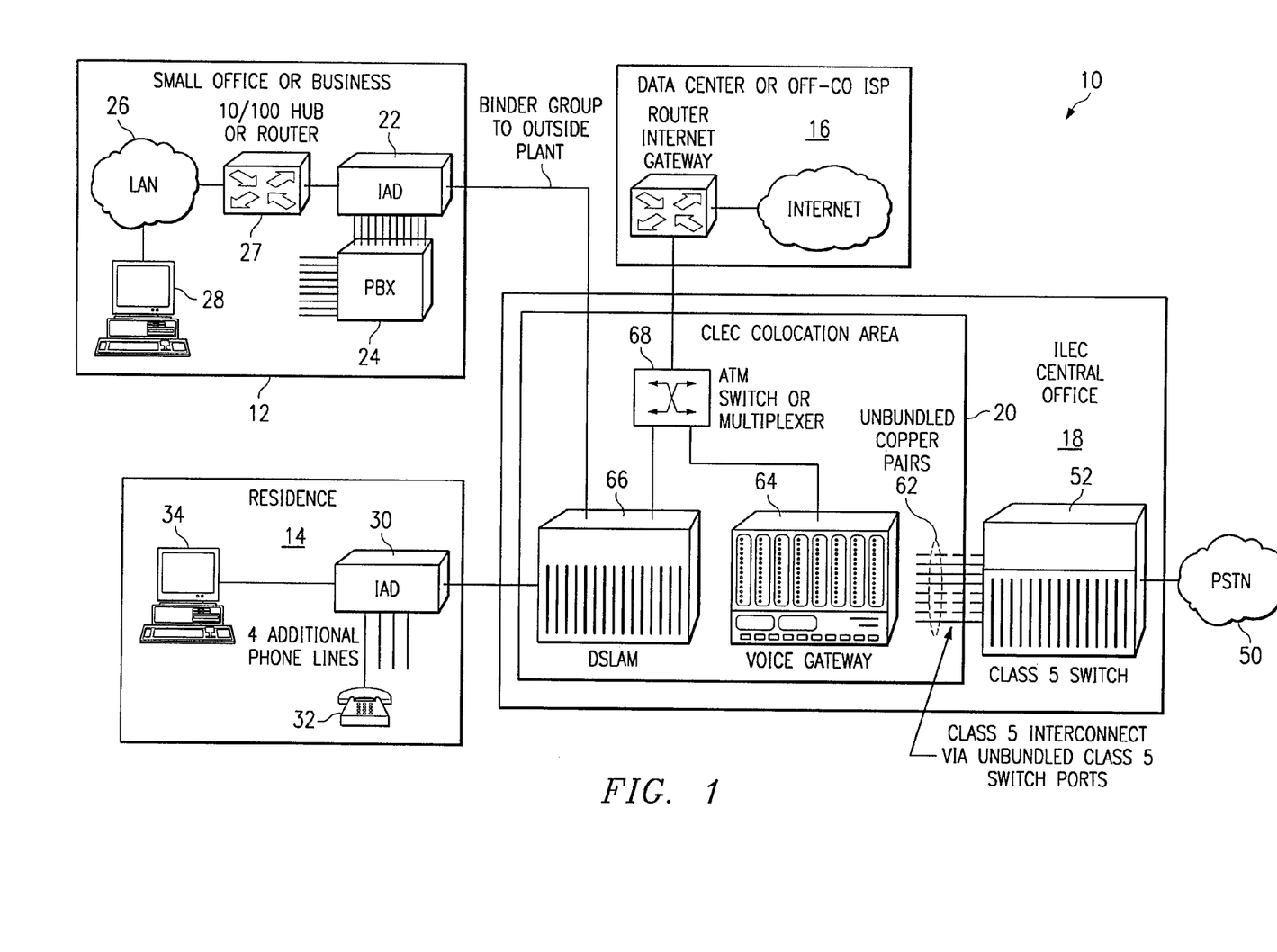
FIG. 1 illustrates a block diagram of a telecommunications network.

FIG. 1 is a block diagram of a portion of a telecommunications network 10. Telecommunications network 10 includes one or more office customer premises 12, one or more residence customer premises 14, one or more information service providers 16, one or more independent local exchange carrier central offices 18, and one or more competitive local exchange carriers 20.

Office customer premises 12 may receive data and voice at an Integrated Access Device (IAD) 22. IAD 22 may provide data and voice to a private branch exchange 24 in order to support telephony operations at telephony devices 25 within office customer premises 12. IAD 22 may also provide data and voice to a local area network 26 through a router 27. Local area network 26 may have computers or other devices 28 connected thereto for processing the data and voice received from IAD 22 in order to support computer processing and telephony capability over local area network 26. Data and voice generated by devices 25 and 28 connected to local area network and private branch exchange 24 may also be transferred out of office customer premises 12 by IAD 22.

Residence customer premises 14 may receive data and voice at an IAD 30. IAD 30 may provide data and voice to telephony devices 32 and also to computing devices 34 connected thereto. Data and voice generated by either telephony devices 32 or computing devices 34 or both may be transferred out of residence customer premises 14 through IAD 30.

Information service provider 16 may receive data at an Internet gateway 40 from competitive local exchange carrier 20. Internet gateway 40 provides the interface to Internet 42. Information service provider 16 supports connections to Internet 42 for the passage of data thereto and therefrom through Internet gateway 40 as received from or provided to competitive local exchange carrier 20.

Independent local exchange carrier central office 18 may receive data and voice carried by a public switched telephone network 50. A Class 5 switch 52 is the interface to and from public switched telephone network 50. Class 5 switch 52 passes voice and data received from public switched telephone network 50 to competitive local exchange carrier 20. Competitive local exchange carrier 20 provides voice and data to office customer premises 12 and residence customer premises 14 from Class 5 switch 52. Voice and data may be received from office customer premises 12 and residence customer premises 14 by competitive local exchange carrier 20 for transfer to Class 5 switch 52.

Competitive local exchange carrier 20 includes a voice gateway 64 receives voice and data from and provides voice and data Class 5 switch 52. Unbundled analog line connections 62 are provided from Class 5 switch 52 to voice gateway 64. By providing a capability to interconnect to Class 5 switch 52 using standard unbundled analog lines 62, competitive local exchange carrier 20 is able to provide voice functionality over its broadband network without needing its own overlay Class 5 switch or digital loop carrier architecture. A Digital Subscriber Line Access Multiplexer (DSLAM) device 66 provides an interface for voice and data with office customer premises 12 and residence customer premises 14. DSLAM device 66 and voice gateway 64 pass voice and data to and from each other or to and from information service provider 16 through a packet switch 68. Packet switch 68 may operate using any of a variety of packet techniques to include asynchronous transfer mode and frame relay. Voice and data may be transferred throughout telecommunications network 10 in any of a variety of packet formats to include asynchronous transfer mode cells, frame relay packets, and Internet protocol. Competitive local exchange carrier 20 may also implement multiple packet switches 68, each using a different packet technique. Though shown, competitive local exchange carrier 20 need not be colocated with independent local exchange carrier central office 18.

For voice operation from public switched telephone network 50, a voice signal is transferred over public switched telephone network 50 to Class 5 switch 52. Class 5 switch 52 routes the voice signal to voice gateway 64 over an unbundled analog line 62. Voice gateway processes the voice signal for transfer to DSLAM device 66 through packet switch 68. The processing that may be performed by voice gateway 64 may include multiplexing, analog-to-digital conversion, compression, and packetizing. DSLAM device 66 provides the voice signal to its intended destination, such as office customer premises 12 or residence customer premises 14.

For voice operation to public switched telephone network 50, a voice signal is generated at, for example, office customer premises 12 and transferred to DSLAM device 66. DSLAM device 66 receives the voice signal from office customer premises 12 and prepares the voice signal for transport over packet switch 68 to voice gateway 64. Upon receipt of the voice signal, voice gateway 64 converts the voice signal into its appropriate analog format for transfer over an unbundled analog line 62. The unbundled analog line 62 carries the voice signal to Class 5 switch 52. Class 5 switch 52 transfers the voice signal to its appropriate destination on public switched telephone network 50.

Voice gateway 64 provides a capability to packetize and compress circuit switched voice circuits from public switched telephone network 50 and deliver them over broadband networks to business and residential customers. With this capability, telecommunications service providers may offer, according to the preferred embodiment, twenty-four independent voice lines over one Digital Subscriber Line circuit. Voice gateway 64 supports a variety of types of network framing, such as voice over asynchronous transfer mode and voice over Internet protocol. Additionally, voice gateway 64 supports the latest in voice compression technologies so that calls placed through voice gateway 64 sound similar to calls placed over public switched telephone network 50. Multiple phone lines can be imbedded into the broadband data stream and additional lines can be added or subtracted on demand over a single copper circuit.

Figure 2:
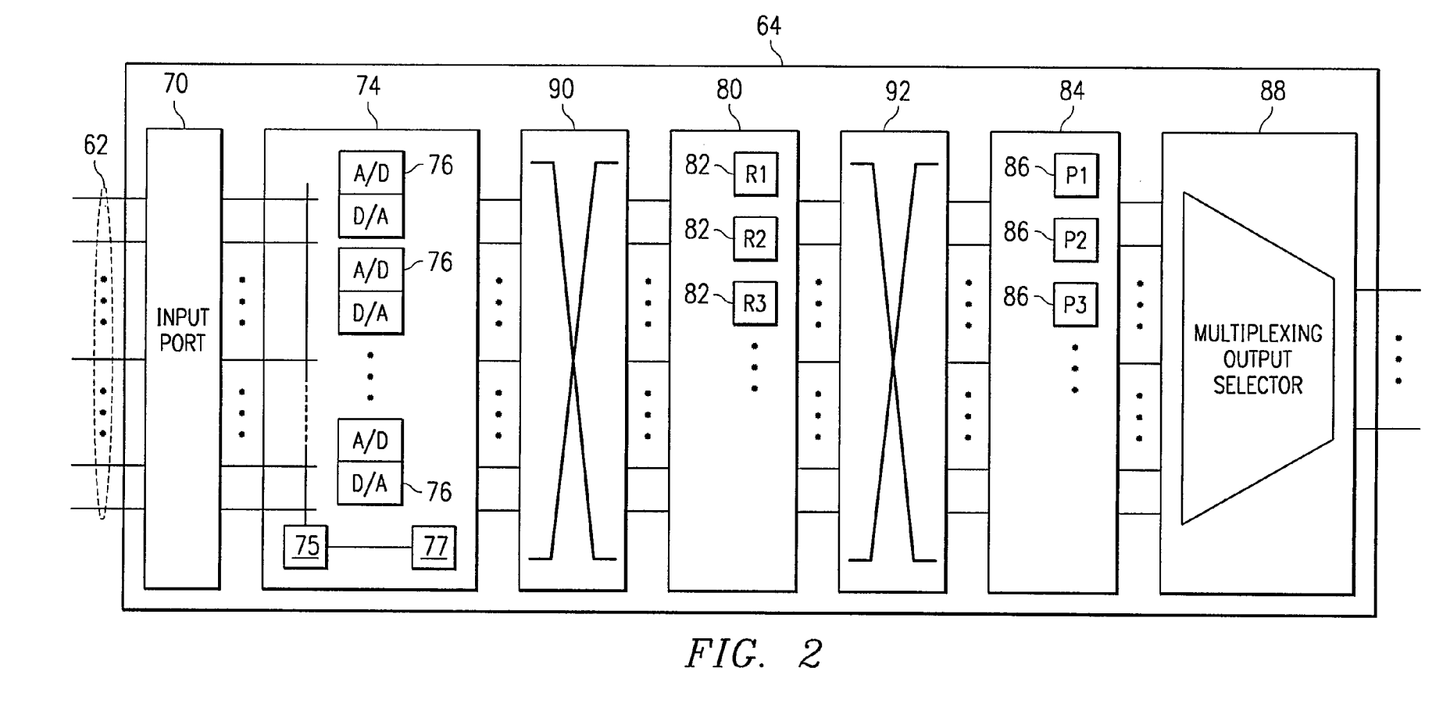
FIG. 2 illustrates a block diagram of a voice gateway within the telecommunications network.

FIG. 2 is a block diagram of voice gateway 64. Voice gateway 64 includes an input port 70 to receive and provide voice signals from and to unbundled analog lines 62 of Class 5 switch 52. An analog-to-digital and digital-to-analog converter unit 76 includes A/D and D/A converters 78 that convert voice signals received from unbundled analog lines 62 into a digital format and convert voice signals transferred to unbundled analog lines 62 into an analog format. A compressing/de-compressing unit 80 includes compressors/de-compressors 82 that compress voice signals received from A/D and D/A converters 78 into a compressed format and de-compress voice signals prior to conversion into analog format. A packetizing unit 84 includes packetizers/de-packetizers 86 that packetize voice signals into a packet format and de-packet voice signals from the packet format prior to de-compression. An output port 88 provides voice signals to and receives voice signals from DSLAM device 66 through packet switch 68. Output port 88 is capable of multiplexing multiple voice signals together through interleaving of packets of different voice signals onto an output line to packet switch 68. Output port 88 may also selectively place any voice signal onto any of its output lines according to the destination characteristics of each voice signal. For example, output port may multiplex five voice signals onto a first output line and multiplex three other voice signals onto a second output line.

Compressors/de-compressors 82 may implement different compression ratios. For example, compressor/de-compressor R1 may perform voice compression using the standard G.711 compression technique of 64 kilobits per second pulse code modulation. Compressor/de-compressor R2 may perform voice compression using the standard G.722 compression technique of 32 kilobits per second adaptive differential pulse code modulation. Compressor/de-compressor R3 may perform voice compression using the standard G.726 compression technique of 16 kilobits per second compression. Whichever compression technique is selected for a voice signal, a customer experience of placing a call through voice gateway 64 will be indistinguishable from a call placed only over public switched telephone network 50. Selection of which compression technique to perform on a particular voice signal is determined by the configuration of a first switching matrix 90. First switching matrix 90 is capable of dynamically routing any voice signal received to any one of compressors/de-compressors 82 in order to support selective compression of voice signals. Appropriate de-compression is also performed followed by selective routing through first switching matrix 90 to an appropriate A/D and D/A converter 78.

Packetizers/de-packetizers 86 may implement different transport framing philosophies. For example, packetizer/de-packetizer P1 may packetize the voice signal into asynchronous transfer mode cells. Packetizer/de-packetizer P2 may packetize the voice signal into frame relay packets. Packetizer/de-packetizer P3 may packetize the voice signal into an Internet protocol format. The Internet protocol format may then be carried in the asynchronous transfer mode or frame relay format. Selection of which packetizing technique to perform on a particular voice signal is determined by the configuration of a second switching matrix 92. Second switching matrix 92 is capable of dynamically routing any voice signal received to any one of packetizers/de-packetizers 86 in order to support selective packetizing of voice signals. Appropriate de-packetizing is also performed followed by selective routing through second switching matrix 92 to an appropriate compressor/de-compressor 82.

For voice operation from Class 5 switch 52, a voice signal carried over an associated unbundled analog line 62 is received at input port 70. Input port 70 performs electrical analog termination of the incoming unbundled analog line 62 and insures that the lines are properly terminated. Input port 70 provides the voice signal to a corresponding A/D and D/A converter 76 in analog-to-digital and digital-to-analog converter unit 74. Analog-to-digital and digital-to-analog converter unit 74 may also perform coding and decoding functions of a conventional CODEC unit to include a ring and digit detection unit 75. A control processor 77 may be part of analog-to-digital and digital-to-analog converter unit 74 to supervise and control CODEC functionality. A distinctive ring detection may also be employed to provide an oversubscription capability discussed in more detail later. Analog-to-digital and digital-to-analog converter unit 74 detects a ring condition on unbundled analog line 62 and the corresponding A/D and D/A converter 78 places the voice signal into a digital format. The digitized voice signal passes through first switching matrix 90 where it is routed to a desired compressor/de-compressor 82 in compressing/de-compressing unit 80. The voice signal is compressed and passes through second switching matrix 92 where it is routed to a desired packetizer/de-packetizer 86 in packetizing/de-packetizing unit 84. The voice signal in its packet format transfers through output port 88, possibly multiplexed with other packetized voice signals, and is passed to DSLAM device 66 over an appropriate output line through packet switch 68 for ultimate delivery to office customer premises 12 or residence customer premises 14 over associated digital subscriber lines.

For voice operation to Class 5 switch 52, the voice signal is originated at office customer premises 12 or residence customer premises 14, passes through DSLAM device 66 and packet switch 68, and is received at output port 88 of voice gateway 64. Output port 88 de-multiplexes the voice signal provides the voice signal to an associated packetizer/de-packetizer 86 in packetizing/de-packetizing unit 84 according to an available unbundled analog line 62. The packetizer/de-packetizer 86 removes the voice signal from its transport frame. The voice signal then passes through second switching matrix 92 for routing to an appropriate compressor/de-compressor 82 in compressing/de-compressing unit 80. Compressor/de-compressor 82 de-compresses the voice signal into its full digital format. The voice signal then passes through first switching matrix 90 for routing to an appropriate A/D and D/A converter 78 in analog-to-digital and digital-to-analog converting unit 76. A/D and D/A converter 78 places the voice signal into its analog format. The voice signal is then placed onto its corresponding unbundled analog line 62 at input port 70. The voice signal then passes on to Class 5 switch 52 for further routing through public switched telephone network 50.

Voice gateway 64 may also support an oversubscription capability. Each unbundled analog line 62 may be provisioned to carry voice traffic in a 1:1 ratio where there are the same number of unbundled analog lines 62 for each telephone number. Each unbundled analog line 62 may also be oversubscribed, for example in a 4:1 ratio, where there are four telephone numbers per unbundled analog line 62. Unbundled analog line 62 may also be an Integrated Services Digital Network Basic Rate Interface line with a capability to transfer two simultaneous voice channels. The use of this type of line allows for the immediate doubling of call capacity with or without oversubscription.

For outgoing calls toward Class 5 switch 52, a first telephone device associated with a first one of the four telephone numbers may be in use and thus occupying its associated unbundled analog line 62. A second telephone device associated with a second one of the telephone numbers may be put into use as long as there is a free unbundled analog line 62 connected to voice gateway 64. Output port 88 determines if there is a free unbundled analog line 62 available for connection of the second telephone device, such as through a hunt group search. Output port 88 is capable of connecting any telephone device of office customer premises 12 and residence customer premises 14 to any available unbundled analog line 62 in order to support the oversubscription capability.

For incoming calls from Class 5 switch 52, voice gateway 64 is capable of detecting a distinctive ring given to each telephone number assigned to unbundled analog line 62. In the 4:1 oversubscription example, each of the four telephone numbers has its own unique ring associated therewith. Voice gateway 64 determines which of the customer telephone devices to route the call to according to the detected ring. Though described with reference to a 4:1 ratio, other oversubscription ratios may be equally implemented through this technique.

Thus, it is apparent that there has been provided, in accordance with the present invention, a method and apparatus for providing voice signals to and from a telecommunications switch that satisfies the advantages set forth above. Although the present invention has been described in detail, it should be understood that various changes, substitutions, and alterations may be readily ascertainable by those skilled in the art and may be made herein without departing from the spirit and scope of the present invention as defined by the following claims.

What is claimed is:

1. A system for supporting oversubscription, comprising:
 a telecommunications switch operable to assign a plurality of telephone numbers to a line, to receive an incoming call for one of the telephone numbers, and to route the incoming call associated with the telephone number using the line; and
 a voice gateway coupled to the telecommunications switch using the line, the voice gateway operable to receive the incoming call, to detect a unique distinctive ring assigned to the telephone number associated with the incoming call, and to route the incoming call according to the distinctive ring, wherein telephone numbers associated with different residences or business locations are oversubscribed on the line coupled to the telecommunication switch.

2. The system of claim 1, wherein the voice gateway routes the incoming call by processing the incoming call into digital packets according to the distinctive ring and routes the digital packets to a customer premises interface for further communication to a customer premises.

3. The system of claim 2, wherein the customer premises interface is a Digital Subscriber Line Access Multiplexer (DSLAM) operable to route the digital packets over a twisted pair in a local loop using a digital subscriber line.

4. The system of claim 1, wherein the voice gateway is further operable to route the incoming call to a selected one of a plurality of output lines according to the distinctive ring.

5. The voice gateway of claim 1, wherein the voice gateway processes a subsequent incoming call after terminating the incoming call.

6. The system of claim 1, wherein the telecommunications switch is further operable to assign at least four telephone numbers to the line.

7. A voice gateway for supporting oversubscription of a line coupled to a telecommunications switch, the telecommunications switch operable to assign a plurality of telephone numbers to a line, to receive an incoming call for one of the telephone numbers, and to route the incoming call associated with the telephone number using the line, the voice gateway operable to receive an incoming call with a distinctive ring from the line and to route the incoming call to a destination according to the distinctive ring, wherein telephone numbers associated with different residences or business locations are oversubscribed on the line coupled to the telecommunication switch.

8. The voice gateway of claim 7, wherein the voice gateway routes the incoming call by processing the incoming call into digital packets according to the distinctive ring and routing the digital packets to a customer premises.

9. The voice gateway of claim 8, wherein the voice gateway routes the digital packets to the customer premises using a Digital Subscriber Line Access Multiplexer (DSLAM) operable to route the digital packets over a twisted pair in a local loop using a digital subscriber line.

10. The voice gateway of claim 7, wherein the voice gateway is further operable to route the incoming call to 30 a selected one of a plurality of output lines according to the distinctive ring.

11. The voice gateway of claim 7, wherein the voice gateway processes a subsequent incoming call after terminating the incoming call.

12. The voice gateway of claim 7, wherein the voice gateway is further operable to support oversubscription of at least 4:1.

13. A method for supporting oversubscription of a line coupled to a telecommunications switch, comprising:
receiving an incoming call with a distinctive ring from the line coupled to the telecommunication switch, the telecommunications switch operable to assign a plurality of telephone numbers to a line, to receive an incoming call for one of the telephone numbers, and to route the incoming call associated with the telephone number using the line and routing the incoming call to a destination according to the distinctive ring, wherein telephone numbers associated with different residences or business locations are oversubscribed on the line coupled to the telecommunication switch.

14. The method of claim 13, wherein routing the incoming call to the destination according to the distinctive ring further comprises:
processing the incoming call into digital packets according to the distinctive ring; and
routing the digital packets to a customer premises.

15. The method of claim 14, wherein routing the digital packets to the customer premises further comprises routing the digital packets to a customer premises interface for further communications to the customer premises.

16. The method of claim 13, wherein routing the incoming call to the destination according to the distinctive ring further comprises:
selecting one of a plurality of output lines according to the distinctive ring; and
routing the incoming call using the selected output line.

17. The method of claim 13, further comprising terminating the incoming call before processing a subsequent incoming call.

18. The method of claim 13, further comprising providing at least 4:1 oversubscription of the line.

19. A system for supporting oversubscription of a line coupled to a telecommunications switch, comprising:
means for receiving an incoming call with a distinctive ring from the line coupled to the telecommunication switch, the telecommunications switch operable to assign a plurality of telephone numbers to a line, to receive an incoming call for one of the telephone numbers, and to route the incoming call associated with the telephone number using the line; and
means for routing the incoming call to a destination according to the distinctive ring, wherein telephone numbers associated with different residences or business locations are oversubscribed on the line coupled to the telecommunication switch.

20. The system of claim 19, wherein the means for routing the incoming call to the destination according to the distinctive ring further comprises:
means for processing the incoming call into digital packets according to the distinctive ring; and
means for routing the digital packets to a customer premises.

21. The system of claim 20, wherein the means for routing the digital packets to the customer premises further comprises means for routing the digital packets to a customer premises interface for further communications to the customer premises.

22. The system of claim 19, wherein the means for routing the incoming call to the destination according to the distinctive ring further comprises:
means for selecting one of a plurality of output lines according to the distinctive ring; and
means for routing the incoming call using the selected output line.

23. The system of claim 19, further comprising:
means for terminating the incoming call before processing a subsequent incoming call.

24. The system of claim 19, further comprising:
means for providing at least 4:1 oversubscription of the line.

25. A non transitory computer readable medium including code for supporting oversubscription of a line coupled to a telecommunications switch, the code operable to:
receive an incoming call with a distinctive ring from the line coupled to the telecommunication switch, the telecommunications switch operable to assign a plurality of telephone numbers to a line, to receive an incoming call for one of the telephone numbers, and to route the incoming call associated with the telephone number using the line; and route the incoming call to a destination according to the distinctive ring, wherein telephone numbers associated with different residences or business locations are oversubscribed on the line coupled to the telecommunication switch.

26. The computer readable medium of claim 25, wherein the code for routing the first incoming call to the first destination according to the first distinctive ring is further operable to:

process the incoming call into digital packets according to the distinctive ring; and route the digital packets to a customer premises.

27. The computer readable medium of claim 26, wherein the code for routing the digital packets to the customer premises is further operable to rout the digital packets to a customer premises interface for further communications to the customer premises.

28. The computer readable medium of claim 25, wherein the code for routing the incoming call to the destination according to the distinctive ring is further operable to:

select one of a plurality of output lines according to the distinctive ring; and route the incoming call using the selected output line.

29. The computer readable medium of claim 25, wherein the code is further operable to:

terminate the first incoming call before processing the second incoming call.

30. The computer readable medium of claim 25, wherein the code is further operable to:

provide at least 4:1 oversubscription of the line.

* * * * *